United States Patent [19]
Jorda et al.

[11] Patent Number: 5,928,443
[45] Date of Patent: Jul. 27, 1999

[54] TIRE REINFLATION DEVICE

[76] Inventors: Javier Jorda, 1380 NW. 126th Ave.; Gabriela Jorda, 1380 NW. 126th Ave., both of Sunrise, Fla. 33323

[21] Appl. No.: 08/902,185

[22] Filed: Jul. 29, 1997

[51] Int. Cl.$^6$ .................................................. B60C 23/00
[52] U.S. Cl. ............................................ 152/415; 137/231
[58] Field of Search ............................ 152/415; 137/231, 137/223

[56] References Cited

U.S. PATENT DOCUMENTS

| | | | |
|---|---|---|---|
| 605,238 | 6/1898 | Sutfin | 137/223 X |
| 1,492,838 | 5/1924 | Dilweg | 152/415 |
| 2,227,601 | 1/1941 | O'Brien, Jr. | 152/415 |
| 2,237,559 | 4/1941 | Jenne | 137/223 |
| 2,663,348 | 12/1953 | Farris | 152/415 |
| 4,037,638 | 7/1977 | Mosca | 152/415 |
| 4,269,312 | 5/1981 | Bressler | 206/303 |
| 5,419,377 | 5/1995 | Harris | 141/38 |

FOREIGN PATENT DOCUMENTS 984569  7/1951  France .

*Primary Examiner*—Francis J. Lorin
*Attorney, Agent, or Firm*—Bachman & LaPointe, P.C.

[57] ABSTRACT

An apparatus for inflating a deflated member from a source of compressed air includes a flexible tube member having a first end and a second end; a first coupling at the first end of the tube for connecting to the deflated member; and a second coupling, different from the first coupling, at the second end of the tube for connecting to the source of compressed air; wherein the first coupling includes a check valve for preventing flow from the deflated member to the tube, whereby the first coupling can be connected to the deflated member and the second coupling can be sequentially connected to a plurality of sources of compressed air.

7 Claims, 2 Drawing Sheets

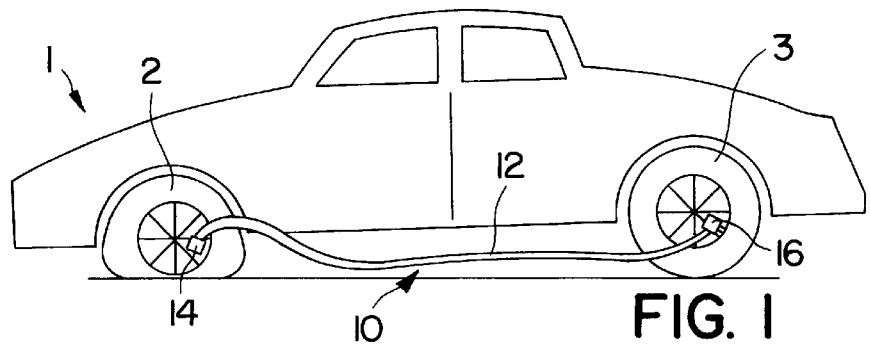
FIG. 1
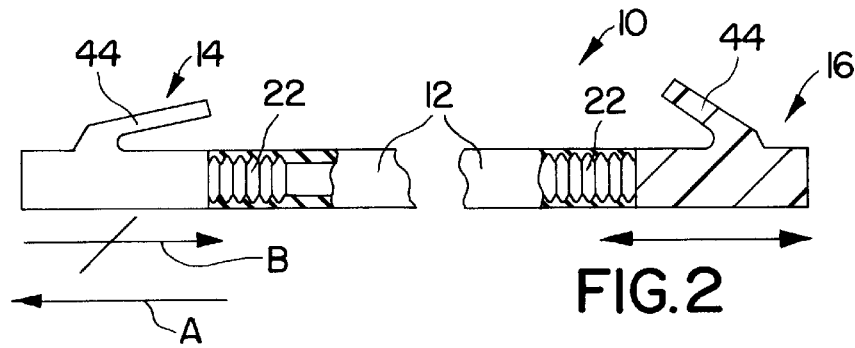
FIG. 2
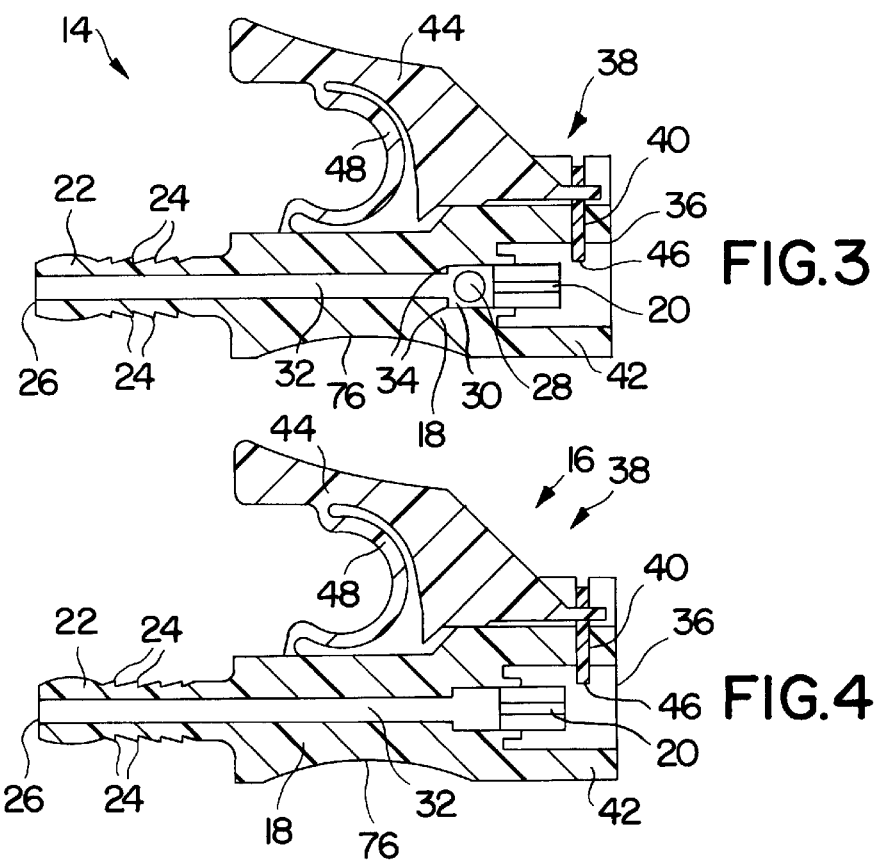
FIG. 3
FIG. 4

5,928,443

TIRE REINFLATION DEVICE

BACKGROUND OF THE INVENTION

The invention relates to an apparatus for inflating deflated objects and, more particularly, to a device for re-inflating a deflated tire from other, inflated, tires and the like.

Under-inflated or deflated tires are an inconvenient and potentially hazardous occurrence. On a typical vehicle, the procedure for changing a flat tire can expose one to hazards from other traffic, elevated or "jacked-up" vehicle, and exposure to the elements. Furthermore, the process of changing a flat or deflated tire for a spare tire requires some strength and can be difficult for some people. Still further, the procedure is time consuming and can result in clothing, hands, etc. being soiled and the like.

A number of disclosures have been made so as to attempt to deal with this problem. See, for example, U.S. Pat. Nos. 1,492,838, 2,227,601, 2,663,348, 4,037,638, 4,269,312 and 5,419,377.

Each of the above patents disclose some method for attempting to transfer air from an inflated tire to a deflated one. Despite these efforts, the need remains for an apparatus for transferring air from a source of compressed air to a deflated or flat tire or similar object which is easy and safe to use, inexpensive to produce, and reliable in conveying air to the deflated member.

It is therefore the primary object of the present invention to provide an apparatus for inflating a deflated member wherein air from one or more sources of compressed air can readily be used to inflate deflated objects.

It is a further object of the present invention to provide such an apparatus wherein proper connection of the device between deflated/inflated members is readily indicated to a user.

It is a still further object of the present invention to provide an extension member for connection to a vehicular spare tire so as to facilitate access thereto for checking proper inflation pressure, inflation to proper pressure, and use in re-inflating other tires.

It is another object of the present invention to provide an apparatus for inflating a deflated member wherein connection to various valve-stem members is facilitated.

Other objects and advantages of the present invention will appear hereinbelow.

SUMMARY OF THE INVENTION

In accordance with the invention, the foregoing objects and advantages are readily attained.

In accordance with the invention, an apparatus for inflating a deflated member from a source of compressed air is provided, which apparatus comprises a flexible tube member having a first end and a second end; a first coupling at said first end of said tube for connecting to said deflated member; and a second coupling, different from said first coupling, at said second end of said tube for connecting to said source of compressed air; wherein said first coupling includes a check valve for preventing flow from said deflated member to said tube, whereby said first coupling can be connected to said deflated member and said second coupling can be sequentially connected to a plurality of sources of compressed air.

In accordance with a preferred embodiment of the invention, first indicia are provided on the first coupling and second indicia are provided on the second coupling so as to indicate which coupling is to be connected to the deflated member.

In accordance with another embodiment of the invention, a spare tire attachment apparatus is provided comprising a flexible tube member having a first end and a second end; means at said first end for sealingly communicating said tube with a spare tire; a check valve at said second end for selectively allowing flow from said tube member through said check valve, whereby air pressure in said spare tire can be measured, increased or decreased remotely.

Other specific advantages and features of the present invention will appear hereinbelow.

BRIEF DESCRIPTION OF THE DRAWINGS

A detailed description of preferred embodiments of the invention follows, with reference to the attached drawings, wherein:

FIG. 1 is a side view of an apparatus according to the invention, in an environment of use;

FIG. 2 is a partially sectional view of elements of the apparatus of FIG. 1;

FIG. 3 is a side sectional view of a valve for connection to a deflated member in accordance with the present invention;

FIG. 4 is a side sectional view of a valve for connection to a source of compressed air or inflated member in accordance with the present invention;

DETAILED DESCRIPTION OF PREFERRED EMBODIMENTS

Figure 4A:
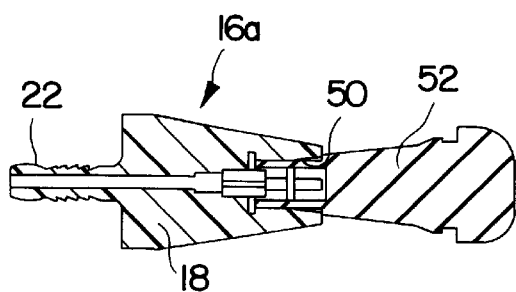
FIG. 4a is a side sectional view of an alternative embodiment of the valve of FIG. 4.

In accordance with the invention, an apparatus is provided for transferring air from a source of compressed air such as an inflated tire and the like to a deflated member such as a flat tire.

Referring to FIG. 1, an automobile 1 is shown having a flat tire 2 and an inflated tire 3. Apparatus 10 in accordance with the present invention comprises a flexible tube 12 having a first coupling 14 for connection to flat tire 2 and a second coupling 16 for connection to inflated tire 3. In accordance with the invention, apparatus 10 advantageously allows air to be transferred from inflated tire 3 to flat tire 2 so as to provide sufficient air in both tires whereby automobile 1 can be driven safely, and without additional damage to tires 2, 3, to a repair station or the like where flat tire 2 can be checked, repaired if necessary, and inflated to proper pressure, and where tire 3 can also be re-inflated to the proper pressure.

Referring to FIG. 2, first coupling 14 and second valve 16 are further illustrated. As shown schematically, first coupling 14 is preferably adapted so as to allow flow into flat tire 2 (arrow A) while prohibiting flow out of flat tire 2 (arrow B). On the other hand, second valve 16 is preferably adapted so as to allow free flow therethrough from inflated tire 3 into tube 12 in accordance with the present invention. This configuration of first coupling 14 and different second coupling 16 advantageously allows for first coupling 14 to be connected to flat tire 2, and second coupling 16 can then sequentially be connected to a plurality of inflated tires 3, the spare tire, tires from other vehicles or other sources of compressed air without losing air from flat tire 2, and further without leaving tube 12 in a pressurized condition during the change from one inflated tire 3 to another. Still referring to FIG. 2, it is preferred in accordance with the present invention that some indicia be provided in connection with first coupling 14 and second coupling 16 to readily indicate to a user thereof which coupling is to be connected to flat tire 2 and which valve is to be connected to inflated tire 3. As shown in FIG. 2, this may preferably be accomplished by providing first coupling 14 and second coupling 16 of a different color, as indicated by the shading of second coupling 16 in FIG. 2. Of course, other types of indicia such as bold lettering, pictures and the like could also be used.

Referring now to FIGS. 3 and 4, preferred embodiments of first coupling 14 and second coupling 16, respectively, are illustrated. As shown, each valve may be provided having a coupling body 18 and a depression member 20 for depressing and thereby opening a valve stem or pin of a typical tire or other inflatable object valve. Furthermore, couplings 14, 16 may be provided having an extension member 22, preferably having one or more ridges 24 or other friction enhancing members, so as to be firmly held when inserted into flexible tube 12 as shown in FIG. 2. Extension member 22 provided as shown with ridges 24 angled away from end 26 of extension member 22 advantageously allow for apparatus 10 to be provided in a disassembled condition, and couplings 14, 16 can be readily and securely inserted into ends of tube 12 by the user of apparatus 10 for use as desired.

A key feature on which coupling 14 is different from coupling 16 is in connection with flow which is allowed through same. As shown in FIG. 2, first coupling 14 is advantageously adapted so as to preclude flow from the deflated object to which it is connected, while allowing flow into the deflated object. In contrast, second coupling 16 is provided so as to freely allow flow therethrough, without restriction, so as to advantageously allow for use of the device as desired without leaving tube 12 pressurized when disconnected from inflated tire 3.

Referring to FIG. 3, desired flow characteristics are provided according to the invention, for example, by providing a ball member 28 which may preferably be positioned in a portion 30 of the flow passage 32 of first coupling 14. As shown, portion 30 is preferably slightly larger in diameter than flow portion 32 so as to provide shoulders 34 defining a seat for ball member 28 as shown. In this configuration, advantageously, when compressed air is being provided through tube 12 into flow passage 32, ball member 28 is forced away from shoulders 34 so as to allow flow into a deflated member attached to end 36 of first coupling 14. When compressed air is removed from tube 12 and flow passage 32, pressure now within the formerly deflated member attached to end 36 forces ball member 28 against shoulders 34 so as to seal same and block against flow out of the formerly deflated member.

Referring to FIG. 4, no such structure is provided or desirable in connection with coupling 16 so that, advantageously, first coupling 14 can be attached to the object to be inflated without releasing whatever air may be within same, and second coupling 16 can be sequentially connected to a number of inflated objects or other sources of compressed air so as to allow air to travel through tube 12 and first coupling 14 into the deflated member, and to depressurize tube 12 while second coupling 16 is disconnected from an inflated member or other source of compressed air.

Referring to both FIGS. 3 and 4, one or more of couplings 14, 16 may suitably be provided with structure 38 for securing first and second couplings 14, 16 to the objects of interest such as, for example, flat tire 2 and inflated tire 3 (FIG. 1). Preferably, at least first coupling 14 is provided with such structure.

Structure 38 may suitably include an engagement member 40 slidably disposed within a sleeve 42 of valve body 18, and a positioning member such as a lever 44 as shown, pivotably disposed relative to valve body 18 and engaged with engagement member 40 such that lever 44, when pivoted, slides engagement member 40 relative to valve body 18. Lever 44 may be used in accordance with the invention to position engagement member 40 between an engaging position as shown in the drawings, wherein an edge 46 of engagement member 40 engages outside threads of a valve stem of an object to be inflated so as to sealingly engage coupling 14, 16 with a valve stem, and a releasing position wherein engagement member 40 and edge 46 thereof are withdrawn from the position shown in FIGS. 3 and 4 so as to allow a valve stem to be readily inserted and/or withdrawn from sleeve 42.

In further accordance with the present invention, lever 44 may be provided with a resilient member 48 for biasing lever 44 and engagement member 40 into an extending or engaging position as shown in the drawings such that, advantageously, either or both of couplings 14, 16 can be releasably but firmly secured to a valve stem of interest.

Referring to FIG. 4a, an alternative embodiment of a second coupling 16 is illustrated. In this embodiment, second coupling 16a is provided in a simpler embodiment wherein no securing structure 38 is provided. Rather, second coupling 16a has a substantially smooth inner surface 50 of sleeve 42, and, during use, is manually held in place to a valve stem 52 of an object from which air is to be taken. In this embodiment, advantageously, the structure of coupling 16 is greatly simplified, and the device can be used in a manner whereby coupling 16a is held in place to obtain air in a simple manual operation, rather than through engaging and disengaging as with the embodiment of FIG. 4.

Figure 5:
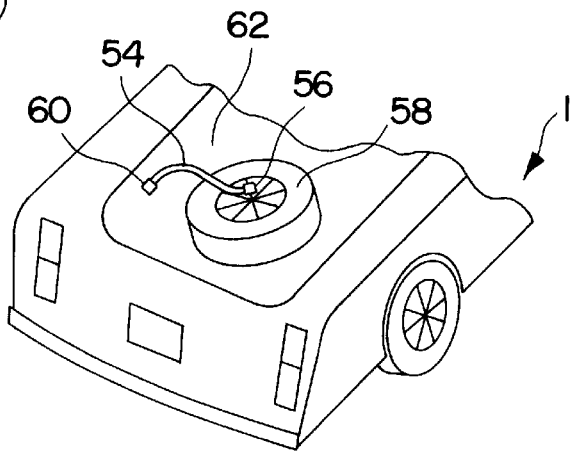
FIG. 5 is a perspective view of a further aspect of the present invention.

Referring now to FIG. 5, a further aspect of the invention is illustrated. In accordance with the invention, a spare tire attachment tube 54 is provided having a releasable but substantially secure attachment member 56 at one end for connecting to and sealingly communicating with spare tire 58, and having a conventional valve stem 60 at the other end. In this way, advantageously, tube 54 can be securely attached to spare tire 58 in advance such that access to tire 58 is greatly facilitated to allow convenient checking of pressure in spare tire 58, as well as inflation to proper pressure and use to inflate a deflated object or tire according to the invention. This is quite advantageous as many automobiles are designed such that spare tire 58 is in a concealed and difficult to reach location either in the trunk, under the vehicle or in other difficult to reach places. Through attachment 54, access to spare tire 58 is provided as described above without having to remove all contents from trunk 62, and without having to disassemble same.

For use in conjunction with apparatus 10 of the present invention, coupling 16 can be connected to valve stem 60 of tube 54 from a convenient location rather than having to extricate spare tire 58 from the trunk 62 of automobile 1.

Figure 6:
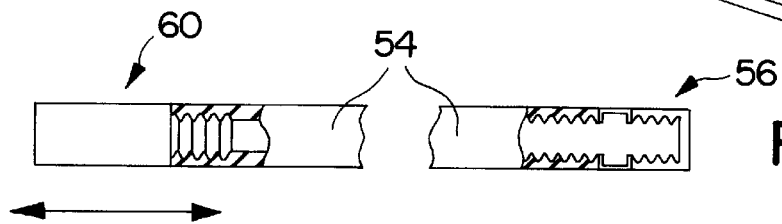
FIG. 6 is a side sectional view of elements of the embodiment of FIG. 5.

Referring also to FIG. 6, attachment member 56 is preferably a threaded and secure attachment (see also FIG. 7) which allows flow freely through to tube 54, for example by opening the check valve of spare tire 58 in an engaged position. Conventional valve stem 60 on the other end of the tube 54, as is well known in the art, preferably includes a valve for confining pressure within tube 54 which valve opens upon the application of a force from outside the valve to a portion of the valve.

Figure 7:
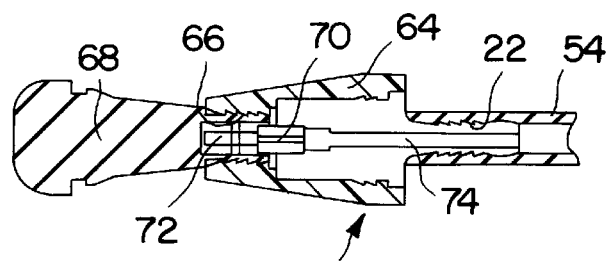
FIG. 7 is a side sectional view of a portion of the apparatus of FIGS. 5 and 6.

FIG. 7 illustrates a preferred embodiment of an attachment 56 for attaching to valve stem 60 of spare tire 58. As shown, attachment 56 preferably includes a valve body 64 having a threaded interior surface 66 for threadably engaging a valve stem 68 of a spare tire. Also as shown, attachment 56 also preferably includes a depression member 70 for engaging the pin 72 of valve stem 68 so as to open flow therethrough. Further, valve body 64 is provided having a flow passage 74 which is substantially unrestricted so as to allow flow from spare tire 58 through valve body 64 and into tube 54 as desired. The spare tire attachment tube 54 in accordance with the present invention may be provided separately, or as an element of a kit including the other portions of apparatus 10 as described above.

Figure 8:
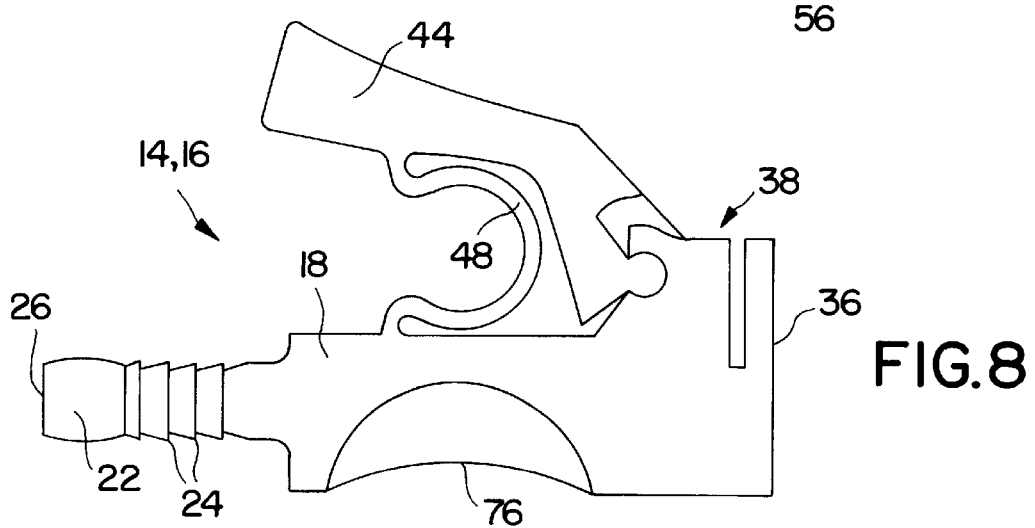
FIG. 8 is a side view of a preferred embodiment of a valve in accordance with the present invention.

Referring now to FIG. 8, first and second couplings 14, 16 which are provided with securing structure 38 are preferably also provided having lever 44 or other pivot structure positioned on one side of valve body 18, and having an indentation or other finger hold or engaging structure 76 positioned at the other side of valve body 18, opposite to lever 44, so as to greatly facilitate the grasping and operation of lever 44 in accordance with the present invention. Finger hold 76 may suitably be provided as an inwardly curving surface or indentation and may suitably have a textured surface to facilitate a sure grasp thereon.

It should readily be appreciated that although the above disclosure is made in terms of inflating a deflated tire from a spare or other inflated tire, that apparatus 10 in accordance with the present invention could suitably be used to inflate any deflated or inflatable item from an already inflated item or other source of compressed air or other gas.

It should also be noted that tubes 12, 54 should be provided of a material having sufficient durability and capacity to withstand expected pressures. In this regard, tubes 12, 54 are preferably rated for confining at least 55 psi. Of course, the rating of tubes 12, 54 depends upon the environment of use and could readily be adapted to same.

It should also be appreciated that in accordance with the foregoing, there has been provided an apparatus for transferring air from an inflated item or other source of compressed air to a deflated or inflatable object in satisfaction of the aforesaid objects of the present invention.

Although the above description is given in terms of use with tires for vehicles, specifically an automobile, the invention is fully applicable to tires for other vehicles and for other inflatable objects as well.

It is to be understood that the invention is not limited to the illustrations described and shown herein, which are deemed to be merely illustrative of the best modes of carrying out the invention, and which are susceptible of modifications of form, size, arrangement of parts and details of operation. The invention rather is intended to encompass all such modifications which are within its spirit and scope as defined by the claims.

We claim:

1. An apparatus for inflating a deflated member from a source of compressed air, comprising:

a flexible tube member having a first end and a second end;

a first coupling at said first end of said tube for connecting to said deflated member; and a second coupling, different from said first coupling, at said second end of said tube for connecting to said source of compressed air; wherein said first coupling includes a hollow sleeve defining, inline, a flow passage, a valve housing downstream of said flow passage and a coupling passage downstream of said valve housing and further includes depression member received in said valve housing and projecting into said coupling passage and a one-way check valve in said valve housing between said depression means and said flow passage for holding said check valve in said valve housing, said check valve preventing flow from said deflated member to said tube while said second coupling allows substantially unrestricted flow therethrough in both directions whereby said first coupling can be connected to said deflated member by said coupling passage and said second coupling can be sequentially connected to a plurality of sources of compressed air.

2. An apparatus according to claim 1, wherein said first coupling further comprises means for securing said first coupling to said deflated member.

3. An apparatus according to claim 2, wherein said means for securing comprises a sleeve forming the coupling passage for positioning over a valve stem of said deflated member wherein said depression member is held against said valve stem for actuating same.

4. An apparatus according to claim 2, further comprising means for securing said second coupling to a source of compressed air.

5. An apparatus according to claim 1, further comprising first indicia on said first coupling and second indicia different from said first indicia on said second coupling.

6. An apparatus according to claim 5, wherein said first coupling is a different color than said second coupling.

7. An apparatus according to claim 1, further comprising a spare tire attachment having a tube extension, a fixed connector at one end of said tube for connecting to said spare tire, and a check valve at the other end of said tube, said second coupling being adapted to connect to said check valve, whereby said spare tire can readily be used as said source of compressed air.

* * * * *